United States Patent Office

2,948,748
POLYENE DICARBOXYLIC ACIDS AND ESTERS THEREOF

Waldemar Guex, Bottmingen, Otto Isler, Basel, Rudolf Rüegg, Bottmingen, and Gottlieb Ryser, Basel, Switzerland, assignors to Hoffmann-La Roche Inc., Nutley, N.J., a corporation of New Jersey No Drawing. Filed Nov. 24, 1958, Ser. No. 775,695

Claims priority, application Switzerland Nov. 27, 1957

13 Claims. (C. 260—485)

This invention relates to polyene dicarboxylic acids and esters thereof. More particularly, the invention relates to polyene dicarboxylic acids containing 30, 34 or 40 carbon atoms and dialkyl esters of such acids. These esters and acids may be represented by the following two structural formulae:

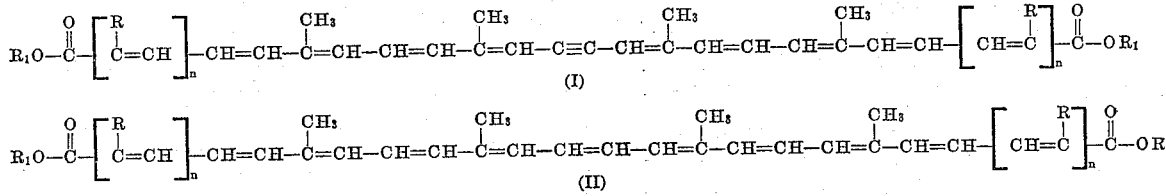

wherein R, beginning with methyl, represents alternately methyl or hydrogen, $R_1$ represents hydrogen or alkyl, and $n$ represents an integer from 1 to 3, in each of the above formulae.

The compounds of this invention are produced by condensing 2,6,11,15 - tetramethyl - 2,4,6,10,12,14 - hexadecahexaen - 8 - yn - 1,16 - dial or 2,6,11,15 - tetramethyl-2,4,6,8,10,12,14 - hexadecaheptaen - 1,16 - dial with a triaryl-phosphorane of the group 3-carbalkoxy-2-buten-1 - yl - triaryl - phosphorane, 5 - carbalkoxy - 3 - methyl-2,4 - pentadien - 1 - yl - triaryl - phosphorane and 7-carbalkoxy - 3 - methyl - 2,4,6 - octatrien - 1 - yl-triaryl-phosphorane and decomposing the adduct formed as a product of the condensation. The product of this reaction is a diester. The ester thus produced may be converted to the corresponding polyene dicarboxylic acid by saponification.

When the dialdehyde containing a central triple bond is used in the condensation with the triaryl-phosphorane, the resulting diester similarly contains a central triple bond. This ester may, if desired, be converted to the corresponding polyene diester having only double bonds in a conjugated system by selectively hydrogenating the central triple bond to a double bond. The diester resulting from the selective hydrogenation in general has the cis configuration about the carbon atoms formerly linked by the triple bond. This compound may be converted to one having the all-trans configuration by isomerization. The diester obtained via the dialdehyde containing the triple bond and the hydrogenation reaction may similarly be converted to the diacid by saponification of the ester groups.

The condensation of 2,6,11,15-tetramethyl-2,4,6,10,-12,14 - hexadecahexaen - 8 - yn - 1,16 - dial or 2,6,11,15-tetramethyl - 2,4,6,8,10,12,14 - hexadecaheptaen - 1,16-dial with the phosphoranes named above may be effected by adding one molar proportion of the dialdehyde to at least two molar proportions of the phosphorane, preferably an excess of the latter, in an inert organic solvent, such as ether, petroleum ether, benzene, methylene chloride, dioxan, tetrahydrofuran, etc. Methylene chloride is preferred. The reaction may be effected by simply admixing the reactants in the solvent at room temperature or at a slightly elevated temperature. It is advantageous to displace the air over the reaction mixture with an inert gas such as nitrogen.

The adduct which results from the reaction of the dialdehyde and the phosphorane gradually decomposes at room temperature into the desired polyene dicarboxylic acid dialkyl ester and the corresponding triarylphosphine oxide. Heating accelerates the decomposition of the adduct. It is preferable to effect the decomposition of the adduct by gently boiling under reflux a methylene chloride solution thereof for several hours.

When a dialkyl ester containing a central triple bond is obtained, the triple bond may be partially hydrogenated to a double bond through the use of a selective hydrogenation catalyst such as a lead-palladium catalyst in the presence of quinoline [Helv. Chim. Acta 35, 446 (1952)]. The hydrogenation may be carried out in an inert organic solvent such as ethyl acetate, toluene, petroleum ether, etc. The resulting compound having the cis configuration about the carbon atoms formerly joined by the triple bond, usually obtained from the hydrogenation, may be isomerized to the all-trans compound, for example, by heating.

The polyene dicarboxylic acid ester may be saponified to the corresponding dicarboxylic acid by reacting with a base, e.g. an alkali metal hydroxide such as sodium hydroxide. Preferably this is effected by dissolving the ester in an inert organic solvent, ether for example, and treating it with an alcoholic solution of alkali metal hydroxide, methanolic sodium hydroxide solution, for example, at room temperature in an inert atmosphere, e.g. under nitrogen.

The phosphoranes referred to above are derived from the corresponding triaryl-phosphonium halides by splitting out hydrogen halide. Thus 3-carbalkoxy-2-buten-1-yl-triaryl-phosphorane is obtained from 3-carbalkoxy-2 - buten - 1 - yl - triaryl - phosphonium halide, 5-carbalkoxy - 3 - methyl - 2,4 - pentadien - 1 - yl - triaryl-phosphorane is derived from 5-carbalkoxy-3-methyl-2,4-pentadien-1-yl-triaryl-phosphonium halide and 7-carbalkoxy - 3 - methyl - 2,4,6 - octatrien - 1 - yl - triaryl-phosphorane is obtained from 7-carbalkoxy-3-methyl-2,-4,6 - octatrien-1-yl-triaryl-phosphonium halide. The triaryl-phosphonium halides may be produced by condensing the appropriate halogenated ester, e.g. γ-halotiglic acid alkyl ester, with a triaryl-phosphine, e.g. triphenyl-phosphine, in an inert solvent such as benzene.

The conversion of the triaryl-phosphonium halide to the triaryl-phosphorane by splitting out hydrogen halide may be effected by treating the former with a metallo organic compound, for example, phenyl lithium or butyl lithium, or with an alkali metal alcoholate, for example, sodium methylate. Preferably the dehydrohalogenation is carried out in an inert organic solvent such as ether, alcohol or especially methylene chloride with the exclusion of oxygen.

The triaryl-phosphorane may be advantageously formed in situ and to the reaction mixture may be added the dialdehyde. Thus, a preferred method of effecting the present invention comprises converting a phosphonium salt having the formula

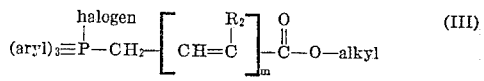

wherein $m$ represents an integer from 1 to 3 and $R_2$, beginning with methyl, represents alternately methyl and hydrogen, into the corresponding triaryl-phosphorane and adding to the reaction mixture in which the phosphorane has been produced, 2,6,11,15-tetramethyl-2,4,6,10,12,14-hexadecahexaen-8-yn-1,16-dial or 2,6,11,15-tetramethyl-2,4,6,8,10,12,14-hexadecaheptaen-1,16-dial and decomposing the adduct formed as a product of the condensation. The diester thus derived may be converted to the corresponding dicarboxylic acid by saponification as described above.

As a result of the reactions discussed, there may be obtained 2,6,10,15,19,23-hexamethyl-2,4,6,8,10,12,14,16,18,20,22-tetracosaundecaen-1,24-dioic acid, 2,6,10,15,19,23 - hexamethyl - 2,4,6,8,10,14,16,18,20,22 - tetracosadecaen - 12 - yn - 1,24-dioic acid, 3,7,11,16,20,24-hexamethyl-1,3,5,7,9,11,15,17,19,21,23,25 - hexacosadodecaen-13-yn-1,26-dioic acid, 3,7,11,16,20,24-hexamethyl-1,3,5,7,9,11,13,15,17,19,21,23,25 - hexacosatridecaen-1,26-dioic acid, 2,6,10,14,19,23,27 - octamethyl-2,4,6,8,10,12,14,18,20,22,24,26,28,30 - dotriacontatetradecaen - 16-yn-1,32-dioic acid and 2,6,10,14,19,23,27,31-octamethyl-2,4,6,8,10,12,14,16,18,20,22,24,26,28,30 - dotriacontapentadecaen - 1,32-dioic acid, and dialkyl esters thereof.

In the discussion above, the term "alkyl" refers to straight chain and branched chain aliphatic hydrocarbon groups such as methyl, ethyl, propyl, isopropyl, butyl, isobutyl, amyl, hexyl, cetyl, lauryl, octadecyl and the like, preferably up to about 18 carbon atoms. Lower alkyl groups such as methyl, ethyl, propyl, isopropyl, butyl, isobutyl, amyl, etc., are most preferred. The aryl groups in the triaryl-phosphoranes discussed above include such monocyclic aryl radicals as phenyl, lower alkyl phenyl, wherein the lower alkyl group is, for example, methyl, ethyl, propyl, isopropyl, and the like, and lower alkoxyphenyl, wherein the lower alkoxy group is, for example, methoxy, ethoxy, propoxy, isopropoxy, and the like. Phenyl is the preferred aryl group. The term "carbalkoxy" as used above refers to the alkoxy radical

wherein $R_3$ represents the alkyl groups defined above. The halogen atom in the triaryl-phosphonium halide may be any of the halogens—chlorine, bromine, iodine, and fluorine.

The diester and diacids obtained according to this invention are crystalline red-to-violet colored compounds and are useful as coloring agents, e.g. for foodstuffs. They are also useful as additives for animal feeds such as poultry feeds, e.g. for heightening the color of egg yolk, skin, shank, meat and fatty tissue. The compounds having no triple bond also have vitamin A activity.

The following examples are illustrative of the invention. All temperatures are in degrees centigrade.

*Example 1*

20 parts by weight of 2,6,11,15-tetramethyl-2,4,6,10,12,14-hexadecahexaen-8-yn-1,16-dial were suspended in 400 parts by volume of synthetic toluene and shaken in the presence of 2 parts by volume of quinoline and 4 parts by weight of palladium-lead catalyst in a hydrogen atmosphere until the absorption of hydrogen ceased. The mixture was filtered and the filter cake was extracted several times with chloroform while boiling. The chloroform solution was concentrated to a small volume and, upon treatment with ethyl acetate, 2,6,11,15-tetramethyl-2,4,6,8,10,12,14-hexadecaheptaen-1,16-dial crystallized in the form of violet flakes, M.P. 190–191°.

7.5 g. of lithium were dissolved in 1000 ml. of liquid ammonia and acetylene was bubbled through the solution. Within 30 minutes a solution of 140 g. of β-acetylacrylic acid methyl ester in 500 ml. of absolute diethyl ether was added dropwise. One half of the ammonia was allowed to evaporate and 70 g. of ammonium chloride were added. Then, the solution was diluted with 250 ml. of absolute ether and hydrolysed with 400 ml. of a saturated ammonium chloride solution. The ether layer was dried with sodium sulfate and the solvent was driven off. The sirupy residue was dissolved in 300 ml. of ethyl acetate and hydrogenated in the presence of 2 g. of Lindlar catalyst. There was obtained 1-carbomethoxy-3-methyl-3-hydroxy-1,4-pentadiene of B.P. 70–75°/0.03 mm., $n_D^{28}=1.4672$. This compound was dissolved in absolute ethanol and treated with phosphorus tribromide to form 1 - carbomethoxy - 3 - methyl - 5-bromo-1,3-pentadiene; $n_D^{29}=1.5385$.

19.5 g. 1-carbomethoxy-3-methyl-5-bromo-1,3-pentadiene were added to a solution of 24 g. of triphenyl-phosphine in 120 ml. of ethyl acetate and the mixture was permitted to stand at room temperature for 24 hours. 1-carbomethoxy - 3 - methyl-1,3-pentadien-1-yl-triphenyl-phosphonium bromide precipitated in the form of a crystalline cake which was used directly in the next step after decanting off the supernatant liquid. The phosphonium bromide was dissolved in 150 ml. of methylene chloride and treated with 31 ml. of a 2 N solution of sodium methylate in methanol under a current of nitrogen. The mixture was stirred for one hour at room temperature and then a solution of 6 g. of 2,6,11,15-tetramethyl-2,4,6,8,10,12,14 - hexadecaheptaen 1,16-dial in 100 ml. of methylene chloride was quickly added. The mixture was stirred for one hour at room temperature and then refluxed for five hours.

After cooling, the deep red reaction solution was washed with 200 ml. of water, dried and filtered through neutral aluminum oxide (activity stage 5). The adsorbent was washed with methylene chloride solution and the clear filtrate was treated with 150 ml. of ethanol. The methylene chloride was then distilled off until crystallization began. The mixture was permitted to stand for two hours in an ice bath and the crystalline slurry which formed was then filtered off under suction. It was washed with alcohol, with low boiling petroleum ether and dried in vacuo at 30–40°. The 1,26-dicarbomethoxy-3,7,11,16,20,24 - hexamethyl - 1,3,5,7,9,11,13,15,17,19,21,23,25-hexacosatridecaene melted at 199°; U.V. absorption maxima at 450, 478 and 513 mμ

$E_1^1=2425$, 3675 and 3380

By concentrating the mother liquor and chromatographing the residue on neutral, weakly active aluminum oxide in benzene-methylene chloride, an additional quantity of the product having the melting point 185–190° was obtained.

*Example 2*

By the procedure described in Example 1, 19.5 g. of 1 - carbomethoxy - 3-methyl-5-bromo-1,3-pentadiene and 24 g. of triphenyl-phosphine were converted to 1-carbomethoxy - 3 - methyl-1,3-pentadien-1-yl-triphenyl-phosphonium bromide and similarly converted to the corresponding phosphorane by means of sodium methylate solution. The phosphorane was treated with 6 g. of 2,6,11,15 - tetramethyl - 2,4,6,10,12,14-hexadecahexaen-8-yn-1,16-dial. The reaction mixture was worked up in the same manner as in Example 1. 1,26-dicarbomethoxy-3,7,11,16,20,24 - hexamethyl - 1,3,5,7,9,11,15,17,19,21,23,25-hexacosadodecaen-13-yne was obtained in the form of fine, red-brown crystals, M.P. 178–180°; U.V. maxima at 457 and 484 mμ

$E_1^1=2740$ and 2460

5.5 g. of 1,26 - dicarbomethoxy-3,7,11,16,20,24-hexamethyl - 1,3,5,7,9,11,15,19,21,23,25 - hexacosadodecaen- 13-yne in 100 ml. of ethyl acetate were hydrogenated in the presence of 1 g. of lead-palladium catalyst and 0.3 ml. of quinoline until 250–270 ml. of hydrogen were absorbed. The catalyst was filtered off and the filtrate was concentrated. The residue comprised a partially crystalline, partially amorphous mass which showed the followed U.V. absorption maxima:

340 m$\mu$, $E_1^1 = 574$ (cis-peak); 518 m$\mu$, $E_1^1 = 2610$ (principal maximum)

Upon boiling for several hours in petroleum ether under nitrogen, the cis-peak disappeared and after crystallization from methanol-methylene chloride, the 1,26-dicarbomethoxy - 3,7,11,16,20,24 - hexamethyl - 1,3,5,7,9,11,13,15,17,19,21,23,25 - hexacosatridecaene obtained was identical with the product of Example 1.

*Example 3*

7.5 g. of lithium were dissolved in 1000 ml. liquid ammonia and acetylene was bubbled through the solution. Within 30 minutes a solution of 140 g. of $\beta$-acetylacrylic acid ethyl ester in 500 ml. absolute diethyl ether was added dropwise. One half of the ammonia was allowed to evaporate and 70 g. of ammonium chloride were added. Then the solution was diluted with 250 ml. of absolute diethyl ether and hydrolysed with 400 ml. of a saturated ammonium chloride solution. The aqueous layer was extracted with diethyl ether, the ether extracts collected, washed with saturated ammonium chloride solution, dried with sodium sulfate, filtered and then concentrated to dryness. There were obtained 135 g. of 1 - carbethoxy - 3 - methyl - 1 - pentaen - 4 - yn - 3 - ol of $n_D^{23} = 1.4710$. 168 g. of the acetylenic carbinol were mixed with 168 ml. of dihydropyrane. 2 ml. of 84% phosphoric acid were added while stirring. The temperature of the solution was kept between 20 and 30° and stored overnight at room temperature. The mixture was extracted with 300 ml. of diethyl ether and the extract washed to netural reaction with a mixture of sodium chloride and sodium bicarbonate solution, then dried with sodium sulfate, filtered, concentrated and distilled in a Vigreux-column. There were obtained 200 g. of $\beta$-tetrahydropyranyl ether of B.P. 85–90°/0.05 mm. 252 g. of this product were hydrogenated in 500 ml. of petroleum ether (boiling range 40–60°) in the pressure of 3 g. of Lindlar catalyst. There were obtained 250 g. of 1-carbethoxy-3-methyl-3-tetrahydropyranyloxy - 1,4 - pentadiene; $n_D^{20} = 1.4700$. This product was poured into 2000 ml. of dry diethyl ether and a solution of 38 g. of lithium aluminum hydride in 500 ml. of diethyl ether was dropwise added at a temperature of $-20$ to $-10°$. 500 ml. of water were added and the mixture dissolved in 1000 ml. of 18% aqueous acetic acid. The aqueous layer was extracted with 250 ml. of ether, the ether extract washed netural with sodium dicarbonate solution, dried with sodium sulfate and the solvent evaporated. There were obtained 210 g. of 4-methyl-4-tetrahydropyranyloxy - 2,5 - hexadiene-1-ol; $n_D^{22} = 1.4820$; B.P.$_{0.05}$ 85–90°. 1000 g. of manganese dioxide were suspended in 4000 ml. of low boiling petroleum ether, 212 g. of the hexadienol were added and the mixture was allowed to react at room temperature for 4 hours. After filtration, drying with sodium sulfate and evaporating off the solvent there were obtained 180 g. of 4-methyl-4-tetrahydropyranyloxy-2,5-hexadien-1-al; $n_D^{25} = 1.4820$; absorption maximum at 220 m$\mu$;

$E_1^1 = 670$ (in ethanol)

100 g. of the hexadienal, 500 ml. of absolute benzene and 170 g. of ($\alpha$-carbethoxy-ethylidene)-triphenyl-phosphorane were heated for 5 hours under reflux. The solvent was eliminated in vacuo and the residue dissolved in 500 ml. of methanol. Then, there were added 125 ml. of water and 1000 ml. of petroleum ether (boiling range 40–50°), and the mixture was agitated. The aqueous-methanolic layer was separated, the ether layer was washed consecutively with methanol and with water, dried with sodium sulfate and the petroleum ether evaporated. The product was a yellowish oil ($n_D^{23} = 1.5170$), which was stirred in 430 ml. of ethanol. The temperature was kept under 5° and 250 ml. of 62% hydrobromic acid were added. After stirring for two hours at 0–5°, the mixture was poured into 1000 ml. of ice water. The product was extracted with 500 ml. petroleum ether, the extract washed with water to neutral reaction, dried with calcium chloride and the solvent evaporated in vacuo at 20–25°. The product obtained (135 g.) was 3-methyl-7-carbethoxy-2,4,6 - octatrien - 1 - yl bromide; $n_D^{24} = 1.5430$; absorption maximum at 300 m$\mu$;

$E_1^1 = 950$ (in petroleum ether)

This product was dissolved in 600 ml. of benzene. 120 g. of triphenyl phosphine were added and the mixture was agitated until dissolution was complete. On storing overnight the product crystallized. The crystals were collected by filtration under suction, washed with benzene and then with petroleum ether (boiling range 40–50°). After drying in vacuo at 50° there were obtained 138 g. of 7-carbethoxy-3-methyl-2,4,6-octatrien-1-yl-triphenyl-phophonium bromide.

10 g. of 7-carbethoxy-3-methyl-2,4,6,-octatrien-1-yl-triphenyl-phosphonium bromide in 100 ml. of dry methylene chloride were reacted with 9 ml. of a 2 N solution of sodium methylate in methanol according to the procedure in Example 1 and then treated with 3 g. of 2,6,11,15 - tetramethyl - 2,4,6,8,10,12,14-hexadecaheptaen-1,16-dial in 50 ml. of methylene chloride and the reaction product was worked up as described in Example 1. 2,6,10,14,19,23,27,31 - octamethyl - 2,4,6,8,10,12,14,16,18,20,22,24,26,28,30 - dotriacontapentadecaen - 1,32 - dioic acid diethyl ester was obtained in the form of violet crystals, M.P. 229–230°; U.V. absorption maxima at: 498, 527 and 565 m$\mu$, $E_1^1 = 2465, 3235$ and $2600$ 200 mg. of the ester obtained above was saponified by stirring in 140 ml. of ether and 40 ml. of a 10% methanolic potassium hydroxide solution for 24 hours at 30° in a nitrogen atmosphere. The mixture was diluted with 300 ml. of water. The potassium salt was obtained as a suspension in the aqueous layer. The latter was washed with ether, acified with 40 ml. 3 N sulfuric acid and extracted three times with methylene chloride. The collected methylene chloride extracts were washed with water to netural reaction, dried with sodium sulfate, filtered and the solvent driven off in vacuo. There was obtained 150 mg. of 2,6,10,14,19,23,27,31-octamethyl-2,4,6,8,10,12,14,16,18,20,22,24,26,28,30 - dotriacontapentadecaen-1,32-dioic acid; M.P. 230°; U.V. maxima at 497, 524 and 561 m$\mu$.

We claim:

1. A process which comprises condensing 2,6,11,15-tetramethyl - 2,4,6,10,12,14 - hexadecahexaen - 8-yn-1,16-dial with a member of the group consisting of 3-carbalkoxy-2-buten-1-yl-triaryl-phosphorane, 5-carbalkoxy-3-methyl-2,4-pentadien-1-yl-triaryl-phosphorane and 7-carbalkoxy-3-methyl-2,4,6-octatrien - 1-yl-triaryl-phosphorane and decomposing the adduct formed as a product of the condensation to obtain an ester represented by the formula

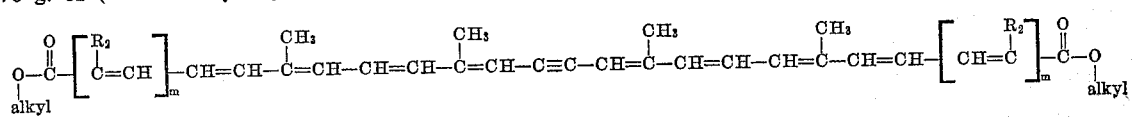

wherein $R_2$, beginning with methyl, represents alternately a member of the group consisting of methyl and hydrogen and $m$ represents an integer from 1 to 3.

2. A process which comprises condensing 2,6,11,15-tetramethyl - 2,4,6,8,10,12,14 - hexadecaheptaen-1,16-dial with a member of the group consisting of 3-carbalkoxy-2-buten-1-yl-triaryl-phosphorane, 5-carbalkoxy-3-methyl-2,4-pentadien-1-yl-triaryl-phosphorane and 7-carbalkoxy-3-methyl-2,4,6-octatrien-1-yl-triaryl-phosphorane and decomposing the adduct formed as a product of the condensation to obtain an ester represented by the formula $$\underset{\text{alkyl}}{O-\overset{O}{\overset{\|}{C}}}-\left[\underset{}{\overset{R_2}{\underset{|}{C}}=CH}\right]_m-CH=CH-\overset{CH_3}{\underset{|}{C}}=CH-CH=CH-\overset{CH_3}{\underset{|}{C}}=CH-CH=CH-CH=\overset{CH_3}{\underset{|}{C}}-CH=CH-CH=\overset{CH_3}{\underset{|}{C}}-CH=CH-\left[CH=\overset{R_2}{\underset{|}{C}}\right]_m-\overset{O}{\overset{\|}{C}}-\underset{\text{alkyl}}{O}$$

wherein $R_2$, beginning with methyl, represents alternately a member of the group consisting of methyl and hydrogen and $m$ represents an integer from 1 to 3.

3. A process which comprises condensing 2,6,11,15-tetramethyl - 2,4,6,10,12,14 - hexadecahexaen - 8-yn-1,16-dial with a member of the group consisting of 3-carbalkoxy-2-buten - 1 - yl-triaryl-phosphorane, 5-carbalkoxy-3-methyl-2,4-pentadien-1-yl-triaryl-phosphorane and 7-carbalkoxy-3-methyl-2,4,6-octatrien - 1-yl-triaryl-phosphorane, decomposing the adduct formed as a product of the condensation to obtain an ester represented by the formula $$R_1O-\overset{O}{\overset{\|}{C}}-\left[\overset{R}{\underset{|}{C}}=CH\right]_n-CH=CH-\overset{CH_3}{\underset{|}{C}}=CH-CH=CH-\overset{CH_3}{\underset{|}{C}}=CH-C\equiv C-CH=\overset{CH_3}{\underset{|}{C}}-CH=CH-CH=\overset{CH_3}{\underset{|}{C}}-CH=CH-\left[CH=\overset{R}{\underset{|}{C}}\right]_n-\overset{O}{\overset{\|}{C}}-OR_1$$

wherein $R_2$, beginning with methyl, represents alternately a member of the group consisting of methyl and hydrogen and $m$ represents an integer from 1 to 3 and saponifying the ester thereby obtained.

4. A process which comprises condensing 2,6,11,15-tetramethyl - 2,4,6,8,10,12,14 - hexadecaheptaen-1,16-dial with a member of the group consisting of 3-carbalkoxy-2-buten-1-yl-triaryl-phosphorane, 5-carbalkoxy-3-methyl-2,4-pentadien-1-yl-triaryl-phosphorane and 7-carbalkoxy-3-methyl-2,4,6-octatrien-1-yl-triaryl-phosphorane, decomposing the adduct formed as the product of the condensation to obtain an ester represented by the formula $$\underset{\text{alkyl}}{O-\overset{O}{\overset{\|}{C}}}-\left[\overset{R_2}{\underset{|}{C}}=CH\right]_m-CH=CH-\overset{CH_3}{\underset{|}{C}}=CH-CH=CH-\overset{CH_3}{\underset{|}{C}}=CH-CH=CH-CH=\overset{CH_3}{\underset{|}{C}}-CH=CH-CH=\overset{CH_3}{\underset{|}{C}}-CH=CH-\left[CH=\overset{R_2}{\underset{|}{C}}\right]_m-\overset{O}{\overset{\|}{C}}-\underset{\text{alkyl}}{O}$$

wherein $R_2$, beginning with methyl, represents alternately a member of the group consisting of methyl and hydrogen and $m$ represents an integer from 1 to 3, heating said ester to isomerize the cis-configuration to trans-configuration and saponifying the said ester.

5. A process which comprises condensing 7-carbethoxy-3-methyl-2,4,6-octatrien - 1-yl-triphenyl-phosphonium bromide with 2,6,11,15-tetramethyl-2,4,6,8,10,12,14-hexadecaheptaen-1,16-dial and heating the reaction product to produce 2,6,10,14,19,23,27,31-octamethyl-2,4,6,8,10, 12,14,16,18,20,22,24,26,28,30 - dotriacontapentadecaen-1,32-dioic acid diethyl ester.

6. A compound represented by the formula $$R_1O-\overset{O}{\overset{\|}{C}}-\left[\overset{R}{\underset{|}{C}}=CH\right]_n-CH=CH-\overset{CH_3}{\underset{|}{C}}=CH-CH=CH-\overset{CH_3}{\underset{|}{C}}=CH-C\equiv C-CH=\overset{CH_3}{\underset{|}{C}}-CH=CH-CH=\overset{CH_3}{\underset{|}{C}}-CH=CH-\left[CH=\overset{R}{\underset{|}{C}}\right]_n-\overset{O}{\overset{\|}{C}}-OR_1$$

wherein $R$, beginning with methyl, represents alternately a member of the group consisting of methyl and hydrogen, $R_1$ represents a member of the group consisting of hydrogen and alkyl, and $n$ represents an integer from 1 to 3.

7. A compound represented by the formula $$R_1O-\overset{O}{\overset{\|}{C}}-\left[\overset{R}{\underset{|}{C}}=CH\right]_n-CH=CH-\overset{CH_3}{\underset{|}{C}}=CH-CH=CH-\overset{CH_3}{\underset{|}{C}}=CH-CH=CH-CH=\overset{CH_3}{\underset{|}{C}}-CH=CH-CH=\overset{CH_3}{\underset{|}{C}}-CH=CH-\left[CH=\overset{R}{\underset{|}{C}}\right]_n-\overset{O}{\overset{\|}{C}}-OR_1$$

wherein $R$, beginning with methyl, represents alternately a member of the group consisting of methyl and hydrogen, $R_1$ represents a member of the group consisting of hydrogen and alkyl, and $n$ represents an integer from 1 to 3.

8. 2,6,10,14,19,23,27,31 - octamethyl - 2,4,6,8,10,12,14, 16,18,20,22,24,26,28,30 - dotriacontapentadecean - 1,32-dioic acid dialkyl ester.

9. 2,6,10,14,19,23,27,31 - octamethyl - 2,4,6,8,10,12,14, 16,18,20,22,24,26,28,30 - dotriacontapentadecaen - 1,32-dioic acid diethyl ester.

10. 1,26-dicarbalkoxy - 3,7,11,16,20,24 - hexamethyl-1,3,5,7,9,11,13,15,17,19,21,23,25-hexacosatridecaene.

11. 1,26-dicarbomethoxy - 3,7,11,16,20,24 - hexamethyl-1,3,5,7,9,11,13,15,17,19,21,23,25-hexacosatridecaene.

12. 1,26-dicarbalkoxy - 3,7,11,16,20,24 - hexamethyl-1,3,5,7,9,11,15,17,19,21,23,25 - hexacosadodecaen-13-yne.

13. 1,26-dicarbomethoxy - 3,7,11,16,20,24 - hexamethyl-1,3,5,7,9,11,15,17,19,21,23,25 - hexacosadodecaen - 13-yne.

No references cited.